US012747145B2

(12) United States Patent
Forman

(10) Patent No.: US 12,747,145 B2
(45) Date of Patent: Sep. 29, 2026

(54) EQUIPMENT PLATFORM

(71) Applicant: Jack Ramp-It, LLC, Lake Peekskill, NY (US)

(72) Inventor: Alan B. Forman, Lake Peekskill, NY (US)

(73) Assignee: Jack Ramp-It, LLC, Lake Peekskill, NY (US)

(*) Notice: Subject to any disclaimer, the term of this patent is extended or adjusted under 35 U.S.C. 154(b) by 716 days.

(21) Appl. No.: 18/164,344

(22) Filed: Feb. 3, 2023

(65) Prior Publication Data

US 2024/0262666 A1 Aug. 8, 2024

(51) Int. Cl.
*B66F 9/12* (2006.01)
*B66F 9/075* (2006.01)

(52) U.S. Cl.
CPC .......... *B66F 9/127* (2013.01); *B66F 9/07504* (2013.01)

(58) Field of Classification Search
CPC .... B66F 9/127; B66F 9/07504; A47B 91/005; B60P 1/431; B60P 1/435; B60P 1/43; B60P 1/438; B65G 69/30; A61G 3/061; A61G 3/067
See application file for complete search history.

(56) References Cited

U.S. PATENT DOCUMENTS 4,911,084 A * 3/1990 Sato .......................... B65D 19/44 108/55.3
5,505,140 A * 4/1996 Wittmann .............. B65D 19/38 108/51.11
5,803,523 A * 9/1998 Clark ...................... B60P 1/435 296/61
9,213,367 B1 * 12/2015 Nelson ................... B65D 19/06
9,327,952 B1 * 5/2016 Kolharkar ............ B65G 1/0435
10,702,064 B1 * 7/2020 Beattie ................... F16M 13/00
2014/0023476 A1 * 1/2014 Neuwirth ............... B65G 1/026 108/51.11
2014/0133952 A1 * 5/2014 Carling ............. B65D 19/0004 414/800
2018/0127147 A1 * 5/2018 Embleton .............. B65D 19/42
2020/0223584 A1 * 7/2020 Tripp ..................... B65D 19/06
2023/0035239 A1 * 2/2023 Colsen ................... B65G 65/00
2023/0219795 A1 * 7/2023 Schlabach ........... B66F 9/07504 187/222
2023/0312169 A1 * 10/2023 Glaser ................ B65D 19/0026 108/57.25
2024/0017881 A1 * 1/2024 Martin ................. B65D 19/385

* cited by examiner

*Primary Examiner* — Glenn F Myers
(74) *Attorney, Agent, or Firm* — Rod Law LLC; Roderick J. O'Dorisio

(57) ABSTRACT

Embodiments of the present disclosure are directed to an equipment platform comprising a top portion, a bottom portion, and a hollowed portion between the top and bottom portions. The hollowed portion may comprise two entry inlets configured to receive a pair of forklift tynes. The equipment platform has a lower section and an upper section on the top portion, where the lower section is configured to receive a heavy piece of equipment, such as a pallet jack, and the upper section is configured to receive at least one person that may guide and stabilize the piece of equipment in the lower section. Modifications to the equipment platform may include attaching handrails and/or cables to the upper section to increase the safety of a person standing in the upper section of the equipment platform.

20 Claims, 8 Drawing Sheets

EQUIPMENT PLATFORM

TECHNICAL FIELD

The present application is directed to the fields of pallet jacks, platforms for loading, equipment for loading and securing objects and equipment, and loading and unloading equipment (e.g., from vehicles, ships, and other transportation).

BACKGROUND

Pallet jacks are used for moving pallets around. In many instances, pallet jacks are loaded onto vehicles, such as the back of a semi-truck, so that the pallet jack can be transported and used in different locations. However, loading and unloading the pallet jack from the back of a truck or other transportation vessel is often cumbersome and difficult, especially if the pallet jack is a heavy-duty and/or heavy-weight pallet jack.

More generally, loading and unloading equipment from the back of a truck or transportation vessel can be cumbersome and difficult. The difficulty is exacerbated if the equipment to be loaded/unloaded is heavy or has an unusual weight-and-balance configuration. In some situations, the difficulty of loading and unloading a piece of an equipment may be diminished by a truck with a lift gate or other automatic lifting mechanism. However, most transport vehicles today are not equipped with lift gates or other automatic lifting mechanisms. Rather, the only way to load and unload heavy pieces of equipment (such as a pallet jack) is to manually lift and load/unload using human labor. If a loading dock is present, loading and unloading freight from the back of a transport vessel may be less difficult. However, in locations without loading docks and without the use of a lift gate, the only way to load or unload freight is via manual, human labor.

As such, a current need exists for a simpler, easier, and safer way to load and unload heavy pieces of equipment, such as a pallet jack, especially when the use of a lift gate or loading dock is unavailable.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

DETAILED DESCRIPTION

Figure 1:
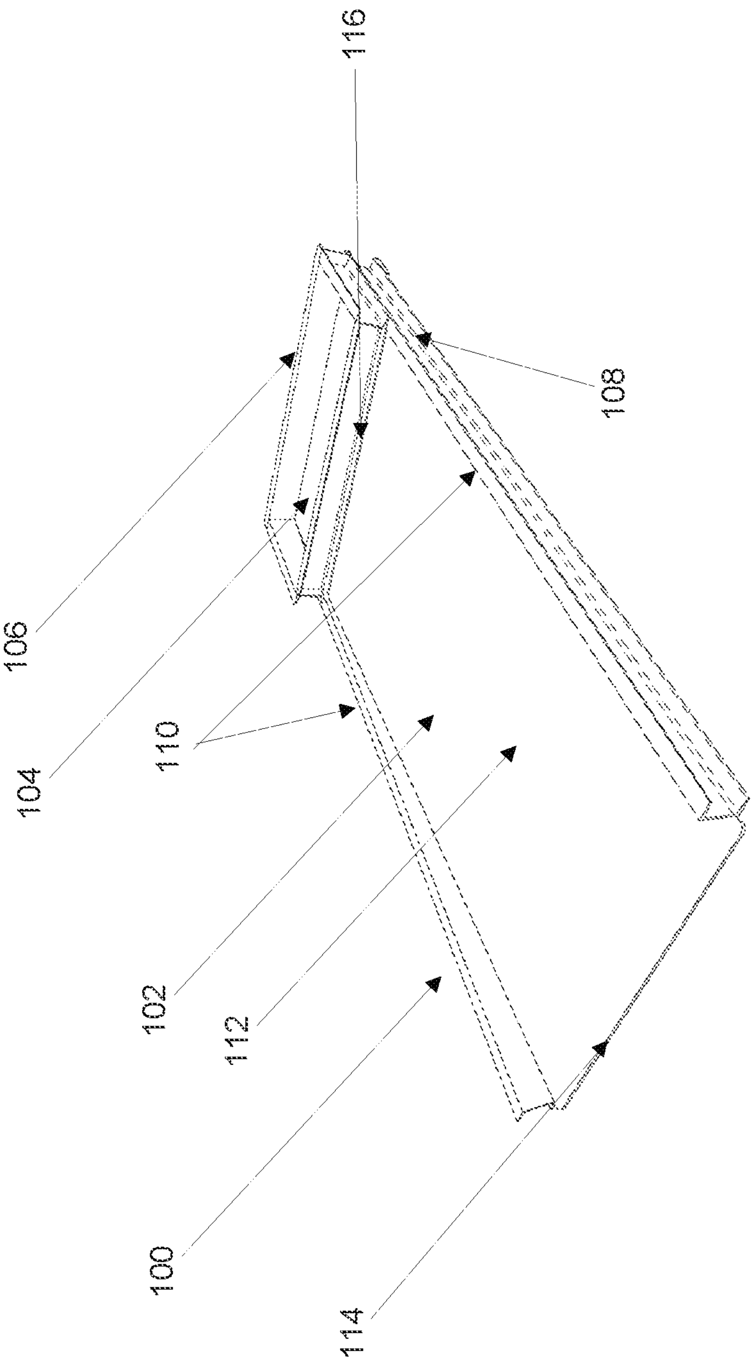
FIG. 1 is a top perspective view which illustrates a particular embodiment of the equipment platform.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. The following detailed description is, therefore, not to be taken in a limiting sense.

Embodiments of the present application are directed to an equipment platform with a top portion that may be divided into at least two sections: a lower section and an upper section. The lower section of the equipment platform may be a rectangular shape that can receive heavy equipment, such as a pallet jack. The upper section of the equipment platform may be elevated and may also have a rectangular shape. The upper section may be smaller than the lower section, and the upper section may receive at least one person or a smaller piece of equipment with similar weight as a single person. The upper section may also be referred to herein as a "safety zone."

The equipment platform may also contain a hollow portion inside the platform that is between a top portion and a bottom portion. The hollow portion may be configured to receive at least two forklift (or other lifting apparatus) "forks" (also known as forklift tynes). The hollow portion may have at least two entry inlets on one side of the equipment platform, specifically on a short axis on the outer edge of the hollowed portion inside the equipment platform. For example, two entry inlets may be affixed to the short side of the equipment platform below the upper, elevated section of the top portion of the equipment platform and above the bottom portion of the equipment platform. The entry inlets may receive at least two forks/skids that may be affixed to a utility vehicle (e.g., hydraulic loader, skid-steer loader, all-terrain vehicle, truck, etc.), so that the equipment platform may be lifted off the ground and moved and maneuvered to a different location.

In some examples, the equipment platform may contain modifications, such as a handrail that is affixed to the border of the upper section, so that a person standing in the upper section of the equipment platform may hold onto a handrail as the equipment platform is lifted off the ground. In other examples, the equipment platform may contain cables that may attach to a harness worn by a person standing in the upper section of the equipment platform. The cables may be affixed to the border of the upper section and/or the handrail.

In yet another example, the equipment platform may be affixed to a utility vehicle with forks, as well as cables connecting to a forklift frame attached to the utility vehicle, which may further secure the equipment platform to the utility vehicle during movement and maneuvering of the equipment platform.

The equipment platform may be configured to receive any piece of equipment, from pallet jacks to small utility vehicles to industrial shelves to crates, etc.

The equipment platform may also be constructed of different materials, such as steel, titanium, other durable metal, wood, impact resistant plastic, high-density polyethylene (HDPE), polycarbonate, acrylonitrile butadiene styrene (ABS), and/or a combination of the aforementioned materials. In some embodiments, the upper section and lower section of the top portion of the equipment platform may be constructed of the same material. In other embodiments, the upper and lower sections may be constructed of different materials (e.g., lower section constructed of steel, upper section constructed of HDPE).

FIG. 1 is a top perspective view which illustrates a particular embodiment of the equipment platform 100. Equipment platform 100 comprises a top portion with two sections: a lower section 102, which is rectangular in shape, and an upper section 104, which may be rectangular in shape. The lower section 102 of the equipment platform has a pair of opposed sidewalls 110 extending along a longitudinal axis L of the lower section. The sidewalls 110 may be in a C-channel shape, which may increase the strength of the equipment platform 100. The lower section 102 has a surface 112 extending along a transverse axis T between the sidewalls 110, wherein the surface 112 may be sloped like a ramp, such that the surface 112 couples to the sidewalls 110 at a bottom edge 114 of the sidewalls and slopes upwards towards the upper section 104 and couples to the upper edge 116 of the sidewalls proximate the upper section 104 so that it may receive a piece of equipment, e.g., a pallet jack with wheels. The upper section 104 may be affixed on top of the lower section 102. Upper section 104 may be constructed to support the weight of at least one person or smaller piece of equipment. Upper section 104 comprises a border 106. The border 106 may be a certain height, such as six inches. The border 106 can increase the safety of a person standing in the upper section of the top portion of the equipment platform 100, especially when the equipment platform 100 is being moved from one location to a second location, e.g., via a utility vehicle with forks.

Equipment platform 100 also comprises a hollowed portion 108 that comprises an interior space between the top portion and a bottom portion of the platform 100. The hollowed portion 108 can be seen in FIG. 2 via the entry inlets 210, 212. The hollowed portion 108 may be configured to receive at least two forks, blades, skids, skis, etc. that can enter into the hollowed portion of the equipment platform 100 and lift the equipment platform 100.

Figure 2:
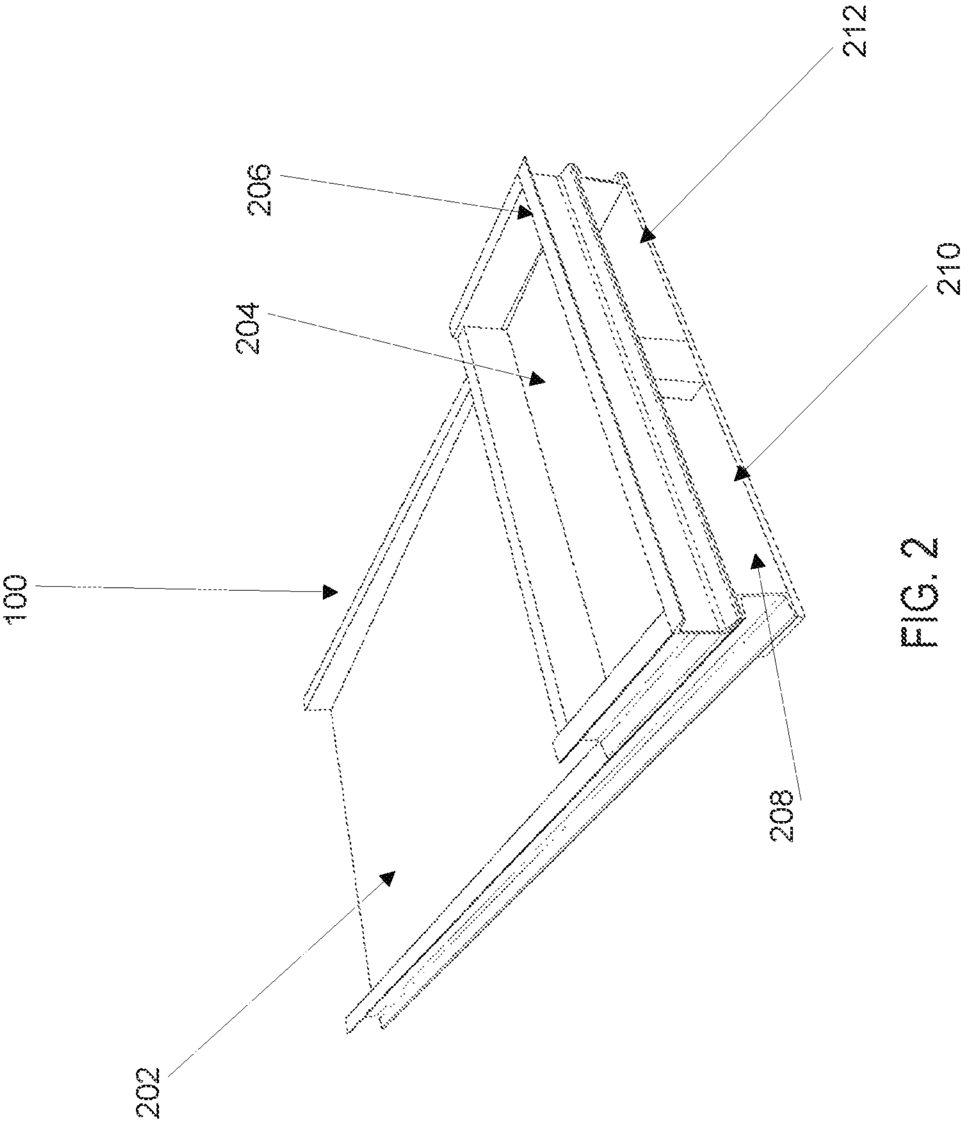
FIG. 2 is a top perspective view from a different angle than FIG. 1 which illustrates a particular embodiment of the equipment platform.

FIG. 2 is a top perspective view from a different angle than FIG. 1 which illustrates a particular embodiment of the equipment platform 100. Equipment platform 100 may comprises a top portion with a lower section 202 and an upper section 204, as described in FIG. 1. The upper section 204 may comprise a border 206 that may be elevated, e.g., by six inches, which may increase the safety of a person standing in the upper section of the top portion of the equipment platform 100. The equipment platform 100 may comprise a hollowed portion 208. The hollowed portion 208 may comprise two entry inlets 210 and 212 that may be configured to receive at least two forks, skids, skis, etc., wherein the forks may be affixed to a utility vehicle. The entry inlets 210 and 212 may receive a pair of forks, so that the equipment platform 100 may be lifted into the air, while the equipment platform 100 has a piece of equipment (e.g., a pallet jack) within the lower section and a person within the upper section of the top portion of the equipment platform. The entry inlets 210 and 212 may be located on a short axis of the outer edge of the hollowed portion 208. The hollowed portion 208 may be enclosed on two longitudinal sides and one traverse short side and may be open on the opposite traverse short side, wherein the opening on the traverse short side comprises at least one entry inlet to receive forklift tynes or other forklift accessories.

Figure 3:
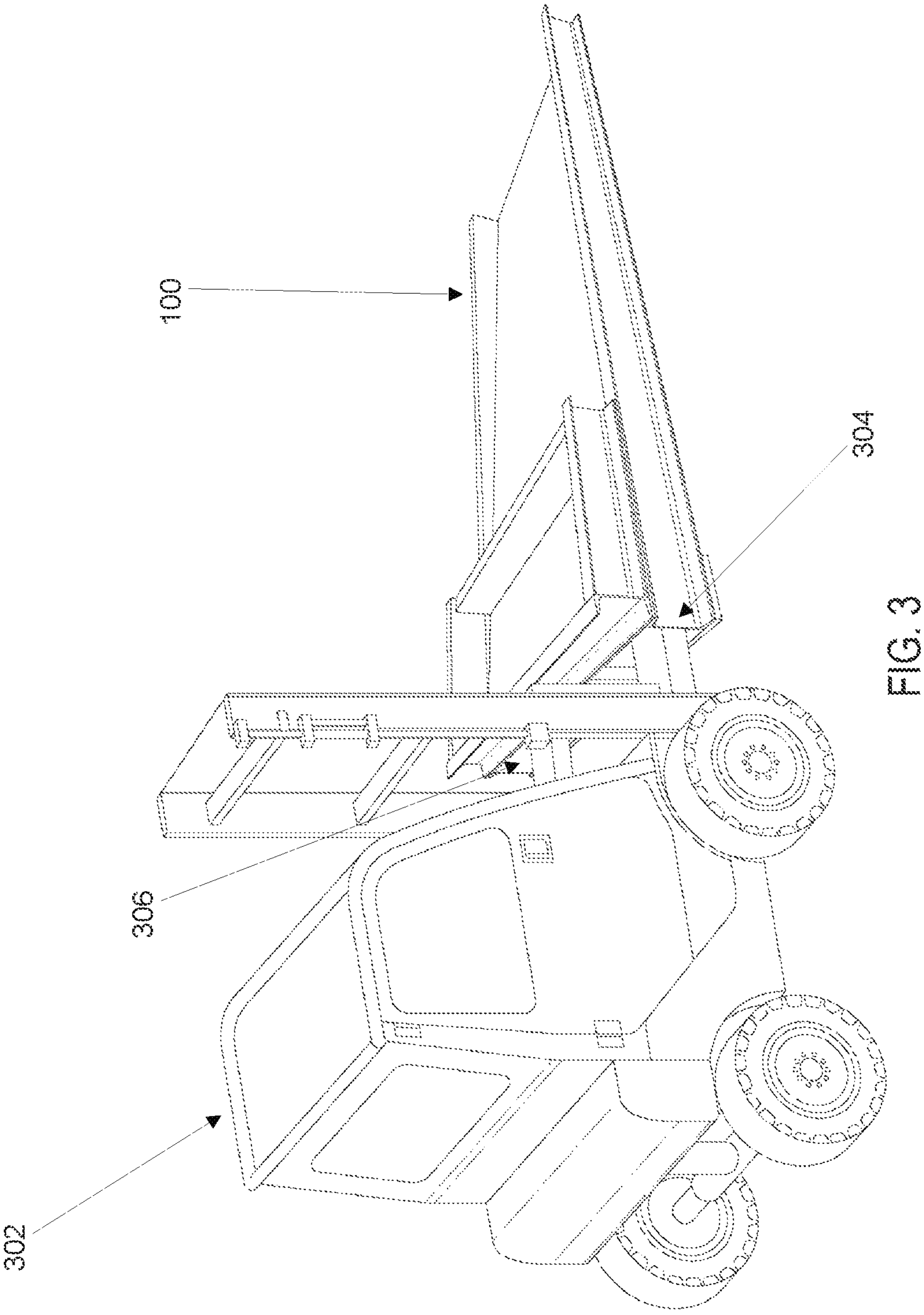
FIG. 3 is a top perspective view which illustrates a particular embodiment of the equipment platform secured to a utility vehicle with a forklift attachment.

FIG. 3 is a top perspective view which illustrates a particular embodiment of the equipment platform secured to a utility vehicle with a forklift attachment. Equipment platform 100 may be hoisted into the air by a utility vehicle 302 with fork attachments. The equipment platform may be configured with at least two entry inlets 304 and 306 that may receive the fork attachments. The entry inlets 304 and 306 may be placed on a short side of the equipment platform, which may be rectangular shaped. In other embodiments, the equipment platform 100 may have a single entry inlet that may be wide enough to receive a single fork/plate for lifting and/or two forks. In other embodiments, the equipment platform 100 may have more than two entry inlets so that multiple forks, skis, plates, etc. can enter into the equipment platform to lift the equipment platform. In some instances, a larger equipment platform may comprise more entry inlets, i.e., the larger the equipment platform, the more entry inlets may be compromised on one side of the equipment platform.

Figure 4:
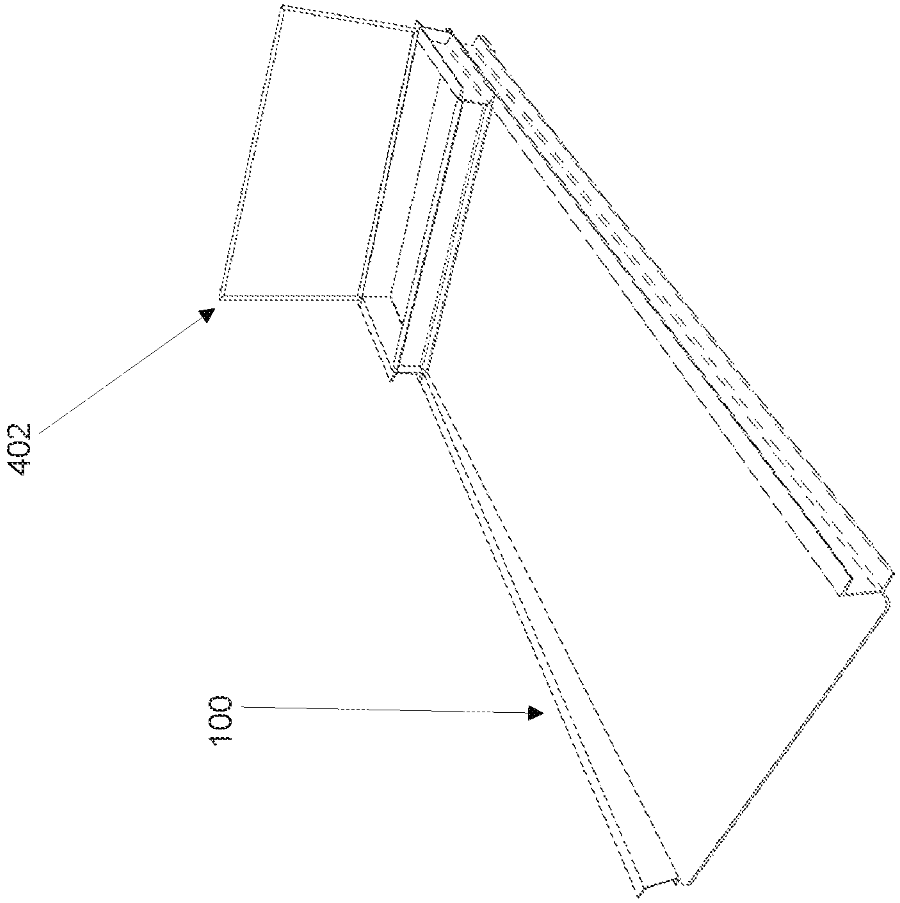
FIG. 4 is a top perspective view which illustrates a particular embodiment of the equipment platform with a handrail attached to the top side of the equipment platform.

FIG. 4 is a top perspective view which illustrates a particular embodiment of the equipment platform with a safety mechanism 402, such as the illustrated a handrail, attached to the top side of the equipment platform 100. As shown in FIG. 4, equipment platform 100 may comprise a handrail 402. The handrail, in some embodiments, may be affixed to the upper section of the top portion of the equipment platform. In other embodiments, the hand rail may be affixed to the lower section, and in other embodiments, a hand rail may span the entire border of the equipment platform, running along the edges of the lower section and upper section of the equipment platform 100.

Figure 5:
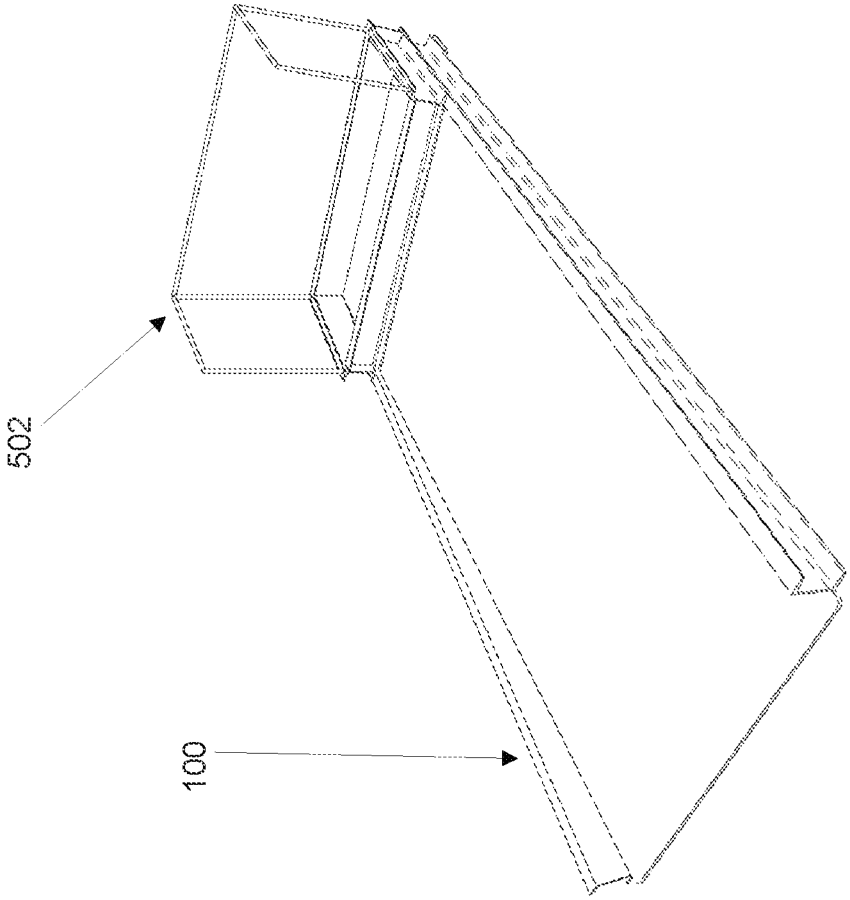
FIG. 5 is a top perspective view which illustrates a particular embodiment of the equipment platform with a handrail attached to the top side of the equipment platform.

FIG. 5 is a top perspective view which illustrates a particular embodiment of the equipment platform with a safety mechanism 502 attached to the top side of the equipment platform 100. As shown in FIG. 5, equipment platform 100 may comprise a safety mechanism 502 that is a handrail 502 that is affixed to three sides of the upper section border on the top portion of the equipment platform. The handrail may have two short sides a long side. Having three sides to the handrail on the upper section may increase the safety of a person standing in the upper section of the equipment platform 100.

Figure 6:
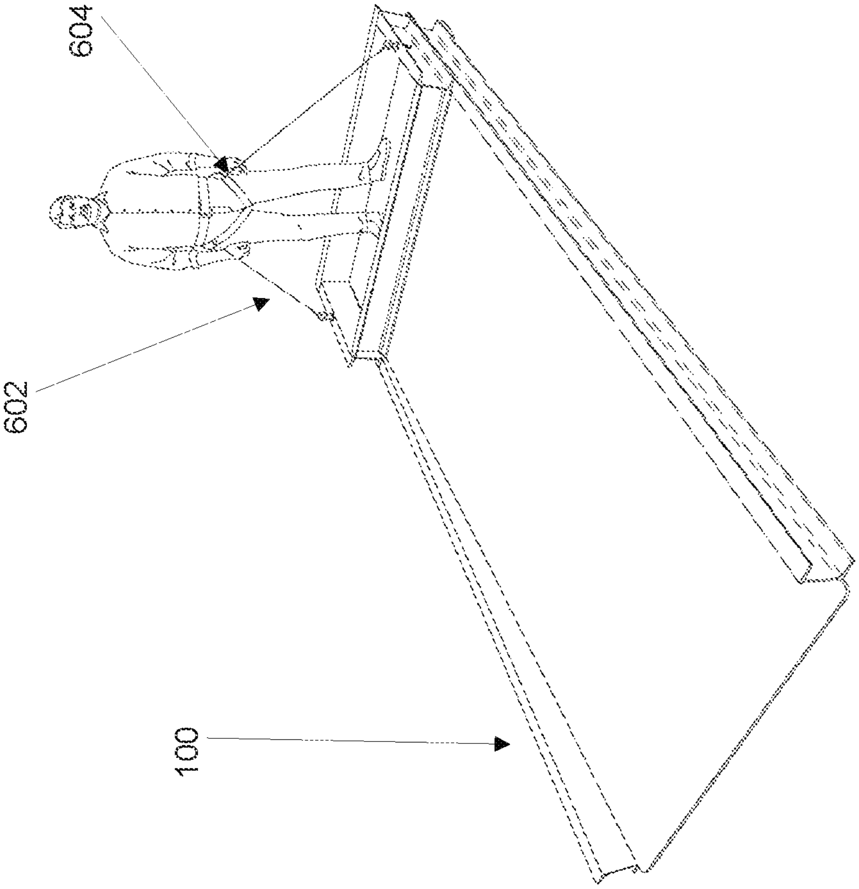
FIG. 6 is a top perspective view which illustrates a particular embodiment of the equipment platform with cable cords connected to a harness.

FIG. 6 is a top perspective view which illustrates a particular embodiment of the equipment platform with another safety mechanism 602, which in this exemplary embodiment comprise cable cords 602 (or simply cables 602) connected to a harness 604, which could be a tool belt or other article worn by a worker. Equipment platform 100 may comprise an upper section with borders, as disclosed in FIGS. 1 and 2. The upper section may also comprise cables 602 that are connected to the borders of the upper section. The cables 602 may connect to a harness 604 worn by a person standing in the upper section of the top portion of equipment platform 100. A person may be in the upper section of the equipment platform to help stabilize and maneuver any piece of equipment that is loaded into the lower section of the equipment platform. For example, a person in the upper section may be responsible for wheeling on and off a pallet jack that is placed onto the lower section of the top portion of the equipment platform 100.

Figure 7:
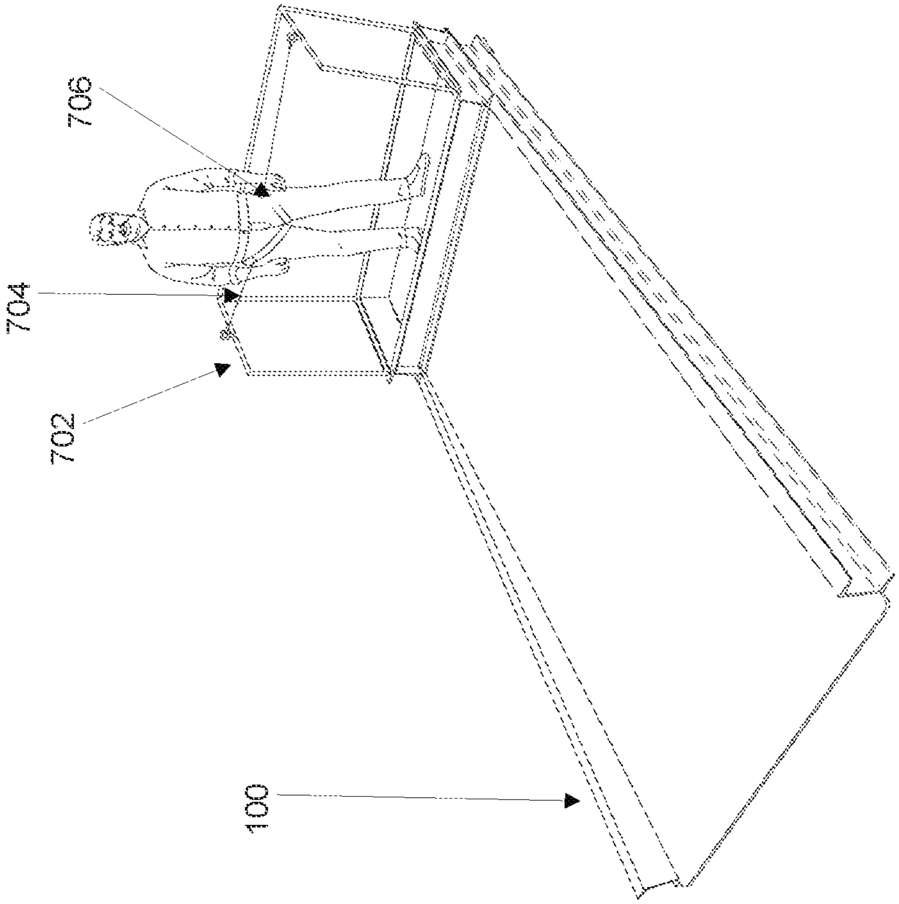
FIG. 7 is a top perspective view which illustrates a particular embodiment of the equipment platform with a handrail attached to the top side of the equipment platform, showing cable cords attached to the handrail.

FIG. 7 is a top perspective view which illustrates a particular embodiment of the equipment platform with yet another safety mechanism, such as the illustrated handrail 702 attached to the top side of the equipment platform with cable cords 704 attached to the handrail and coupled to a harness 706 worn by a worker. Equipment platform 100 may comprise an upper section with a border. A handrail 702 may be affixed to the border of the upper section. Handrail 702 may have three sides—one long side and two short sides, although more or less sides are possible. The handrail 702 may have cables 704 affixed to the handrail 702 that connect to a harness 706, which is worn by a person standing in the upper section of the top portion of the equipment platform 100. In some embodiments, a handrail 702 may be a single handrail with one side. In other embodiments, cables 704 may be a single cable that is attached to the handrail 702, or in other instances, the cable 704 may be attached to the equipment platform itself, such as the border of the upper section of the equipment platform 100.

Figure 8:
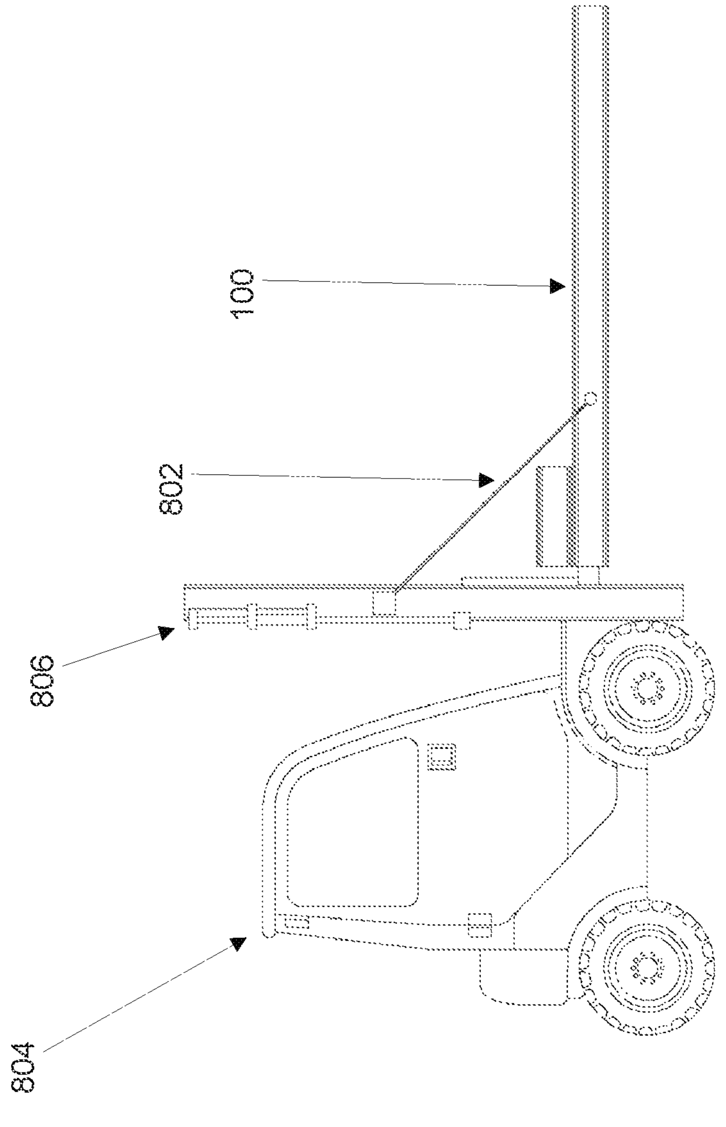
FIG. 8 is a side perspective view which illustrates a particular embodiment of the equipment platform secured to a utility vehicle with a forklift attachment and cables.

FIG. 8 is a side perspective view which illustrates a particular embodiment of the equipment platform secured to a utility vehicle with a forklift attachment and cables. Equipment platform 100 may comprise a hollowed portion between a top portion and a bottom portion of the equipment platform 100. The hollowed portion may be shaped by interior sidewalls that are sloped or angled, so that the hollowed portion may receive at least two forks from a forklift apparatus, such as a utility vehicle 804 with fork attachments, as shown in FIG. 8. The hollowed portion may be larger at the receiving end, where the forklift tynes may enter, and the hollowed portion may gradually become smaller towards the distal end of the equipment platform 100, so that the forklift tynes will be pinched and immovable at the opposite of the receiving end of the hollowed portion. The hollowed portion may be in a triangular shape, where the base of the triangle may comprise the openings or inlets, and the top of the triangle may comprise an intersection point between the interior top portion and the interior bottom portion of the hollowed portion, forming an intersection point that prevents the forklift tynes from extending further inside the hollowed portion. In other words, within the hollowed portion, the top part may gradually slope downwards until it reaches an intersection point with the inside bottom part, so that the tynes (or other fork attachments) can go no further into the equipment platform 100. The forklift tynes may extend along the entire longitudinal axis of the hollowed portion. Equipment platform 100 may be connected to a lifting frame 806 via cables 802, which may further secure the equipment platform 100 to the utility vehicle 804 when the equipment platform is being lifted and moved to a different location. The cables 802 may connect to the side of the equipment platform, either on the lower section or the upper section of the equipment platform. In other embodiments, more than one cable 802 may be used to secure the equipment platform 100 to the utility vehicle 804. The cables 802 may be connected via various fastening mechanisms, including but not limited to, bolt and anchor, hook, quick-detach clips, rings, steel plate mount, cable tie mount, buttons, snaps, and other fasteners.

In some embodiments, the lower section of the equipment platform may be sloped at an angle, so that one short edge of the lower section is near the ground, while the other short edge of the lower section is several inches above the ground. The sloped angle of the lower section may allow a piece of equipment with wheels to easily slide onto the lower section of the equipment platform. The sloped angle of the lower section may be at an angle between 0 and 60 degrees, so the lower section, bottom portion, and short side of the equipment platform form a quasi, right-angle triangle.

The equipment platform may be resized to fit any piece of equipment, small or big. For example, a small equipment platform may be configured to receive a standard size pallet jack, whereas a larger equipment platform may be resized to receive a full 4-wheel utility vehicle.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:

1. An equipment platform, comprising:

a top portion, wherein the top portion comprises at least one rectangular lower section and at least one rectangular upper section, wherein the upper section has a smaller surface area than the lower section, and wherein the at least one rectangular lower section and the at least one rectangular upper section are constructed of different materials;

a pair of opposed sidewalls coupled to the lower section, wherein the pair of opposed sidewalls extends upward from the lower section along a longitudinal axis L and terminates at a bottom edge of the lower section;

a bottom portion; and a triangular-shaped hollowed portion that is between the top portion and the bottom portion, wherein the hollowed portion extends along the longitudinal axis L and a traverse axis T, and wherein the top portion and bottom portion are constructed of at least one of: steel, titanium, impact resistant plastic, high-density polyethylene (HDPE), polycarbonate, and acrylonitrile butadiene styrene (ABS).

2. The equipment platform of claim 1, wherein the hollowed portion comprises at least two entry inlets located on a short axis on an outer edge of the hollowed portion.

3. The equipment platform of claim 2, wherein the two entry inlets are configured to receive at least two forklift tynes.

4. The equipment platform of claim 1, wherein the lower section is sloped upwards towards the upper section, from a first short edge of the equipment platform to a second short edge of the equipment platform.

5. The equipment platform of claim 1, wherein the upper section is elevated above the lower section.

6. The equipment platform of claim 1, wherein the upper section is at least six inches above the lower section.

7. The equipment platform of claim 1, further comprising at least one safety mechanism.

8. The equipment platform of claim 7, wherein the safety mechanism comprises at least one of: a handrail, a cable, a cable and a harness, and a combination thereof.

9. The equipment platform of claim 7, wherein the at least one handrail is affixed to a border of the upper section.

10. The equipment platform of claim 1, further comprising at least one cable.

11. The equipment platform of claim 10, wherein the at least one cable is affixed to a border of the upper section.

12. The equipment platform of claim 10, wherein the at least one cable is affixed to at least one handrail that is affixed to a border of the upper section.

13. The equipment platform of claim 1, wherein the hollowed portion comprises a plurality of entry inlets configured to receive a plurality of forklift tynes.

14. An equipment platform, comprising:

a top portion comprising a sloped, rectangular lower section and an elevated, rectangular upper section, wherein the upper section comprises a smaller surface area than the lower section, and wherein the lower section and the upper section are constructed of different materials;

a border affixed to the outer edge of the upper section, wherein the border is at least six inches above the lower section;

a pair of opposed sidewalls coupled to the lower section, wherein the pair of opposed sidewalls extends upward from the lower section along a longitudinal axis L and terminates at a bottom edge of the lower section; and a triangular-shaped hollowed portion, wherein the hollowed portion comprises an interior space between the top portion and a bottom portion, wherein the top portion and bottom portion are constructed of at least one of: steel, titanium, impact resistant plastic, high-density polyethylene (HDPE), polycarbonate, and acrylonitrile butadiene styrene (ABS).

15. The equipment platform of claim 14, wherein the hollowed portion comprises at least two entry inlets, configured to receive at least two forklift tynes.

16. The equipment platform of claim 14, comprising at least one handrail.

17. An equipment platform, comprising:

a top portion, wherein the top portion comprises a lower rectangular section and an upper rectangular section, wherein the lower rectangular section is sloped at a 45-degree angle, and wherein the upper rectangular section is elevated above the lower rectangular section, wherein the upper rectangular section has a smaller surface area than the lower rectangular section, and wherein the lower rectangular section and the upper rectangular section are constructed of different materials;

a bottom portion that is connected to the top portion via at least four sides;

a pair of opposed sidewalls coupled to the lower rectangular section, wherein the pair of opposed sidewalls extends upward from the lower rectangular section along a longitudinal axis L and terminates at a bottom edge of the lower rectangular section; and a triangular-shaped hollowed portion that is between the top portion and the bottom portion, wherein the hollowed portion comprises two entry inlets configured to receive at least two forklift tynes, wherein the top portion and bottom portion are constructed of at least one of: steel, titanium, impact resistant plastic, high-density polyethylene (HDPE), polycarbonate, and acrylonitrile butadiene styrene (ABS).

18. The equipment platform of claim 1, wherein the upper section of the top portion is comprised of steel.

19. The equipment platform of claim 1, wherein the lower section of the top portion is comprised of steel.

20. The equipment platform of claim 1, wherein the upper section of the top portion comprises high-density polyethylene and the lower section of the top portion comprises steel.

* * * * *